(12) United States Patent
Sugimoto

(10) Patent No.: US 6,178,068 B1
(45) Date of Patent: Jan. 23, 2001

(54) QUASI CONTACT HEAD HAVING A DISK CONTACTING PORTION

(75) Inventor: Masaharu Sugimoto, Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/178,000

(22) Filed: Oct. 23, 1998

(30) Foreign Application Priority Data

Jun. 5, 1998 (JP) .................................................. 10-157687

(51) Int. Cl.⁷ ...................................................... G11B 5/60
(52) U.S. Cl. .................... 360/236.5; 360/237; 360/237.1
(58) Field of Search ................................ 360/103, 126, 360/236.5, 237, 237.1

(56) References Cited

U.S. PATENT DOCUMENTS

| | | | |
|---|---|---|---|
| 5,455,730 | * 10/1995 | Dovek et al. | 360/113 |
| 5,469,312 | * 11/1995 | Watanabe et al. | 360/103 |
| 5,634,259 | * 6/1997 | Sone et al. | 29/603.12 |
| 5,822,153 | * 10/1998 | Lairson et al. | 360/104 |
| 5,844,749 | * 12/1998 | Sakai et al. | 360/103 |
| 5,872,684 | * 2/1999 | Hadfield et al. | 360/103 |
| 5,886,856 | * 3/1999 | Tokuyama et al. | 360/103 |
| 5,896,243 | * 4/1999 | Koshikawa et al. | 360/103 |
| 5,898,542 | * 4/1999 | Koshikawa et al. | 360/103 |
| 5,936,801 | * 8/1999 | Boutaghou et al. | 360/103 |
| 5,978,176 | * 11/1999 | Ezaki et al. | 360/103 |

FOREIGN PATENT DOCUMENTS 09293217    11/1997    (JP) .

* cited by examiner

*Primary Examiner*—Jefferson Evans
(74) *Attorney, Agent, or Firm*—Greer, Burns & Crain, Ltd

(57) ABSTRACT

A quasi contact head comprises a slider with a flying surface opposed to a magnetic disk. A composite layer is formed on the slider at its trailing end so as to contain a head element such as an MR element. The head element is exposed at an exposure surface formed on the composite layer. A step serves to retract the exposure surface from the flying surface. An edge formed between the step and flying surface is subjected to grinding. The edge wears off during the initial rotation of the magnetic disk, so that the flying height of the slider can be set lower.

20 Claims, 5 Drawing Sheets

QUASI CONTACT HEAD HAVING A DISK CONTACTING PORTION

BACKGROUND OF THE INVENTION

1. Field of the Invention

The present invention relates to a magnetic head employed in a magnetic disk drive such as a hard disk drive (HDD). In particularly, the invention relates to a quasi contact head comprising a slider with a flying surface opposed to a magnetic disk, and a composite layer formed on the slider at its trailing end so as to contain a head element, wherein an edge of the slider or composite layer first approaching the magnetic disk is subjected to grinding by an initial abrasion with the magnetic disk.

2. Description of the Prior Art

The ongoing demand to improve the recording density of information recorded on a magnetic disk makes it necessary drive to reduce the magnetic space between a reading/writing gap of a magnetic head element and a magnetic disk. Reduction in the magnetic space must be achieved without causing actual contact between the slider and the magnetic disk in a conventional flying magnetic head generally used. Probability of physical contact between the slider and the magnetic disk is accordingly minimized, possibly to zero, by taking account of any factors varying the flying height of the slider over the surface of the magnetic disk. However, reduction in such probability tends to cause an increase in the flying height of the slider.

On the other hand, a quasi contact head is supposed to reduce the magnetic space between a reading/writing gap and a magnetic disk as compared with the above-mentioned conventional flying magnetic head, since the flying height of the slider can be determined on the assumption that the slider contacts the magnetic disk.

When a quasi contact head employs a magnetoresistance (MR) element, the gap of the MR element is in some cases supposed to collide with a tiny protrusion caused by surface roughness of the magnetic disk. The contact may cause a momentary temperature rise in the gap, namely, a thermal asperity, to thereby bring about a large change in the magnitude of magnetoresistance detected by the MR element. As a result, it is very difficult to allow the MR element to achieve a precise reading operation in the quasi contact head.

SUMMARY OF THE INVENITON

It is accordingly an object of the present invention to provide a quasi contact head capable of allowing a magnetic head element to approach a magnetic disk without causing collision of the magnetic head element with the magnetic disk.

According to a first aspect of the present invention, there is provided a quasi contact head comprising: a slider with a flying surface opposed to a magnetic disk; a composite layer formed on the slider at its trailing end so as to contain a head element; an exposure surface formed on the composite layer so as to expose the head element; a step retracting the exposure surface from the flying surface; and an edge formed between the step and the flying surface, to be subjected to grinding.

In addition, according to a second aspect of the present invention, there is provided a magnetic disk drive comprising: a magnetic disk; a slider with a flying surface opposed to the magnetic disk; a composite layer formed on the slider at its trailing end so as to contain a head element; an exposure surface formed on the composite layer so as to expose the head element; and a step retracting the exposure surface from the flying surface; wherein an intersection between a first plane including the flying surface and a second plane including the step projects within the magnetic disk during rotation of the magnetic disk.

A magnetic disk drive employing the quasi contact head of the first aspect, or a magnetic disk drive of the second aspect, enables determination of the flying height for the slider in consideration of the edge wearing off by the abrasion. As a result, an additional flying height or a flying margin can be reduced to the utmost so as to suppress the flying height of the slider at the lower level. When the edge wears off by the abrasion with the magnetic disk, the magnetic space between the head element to the magnetic disk can be defined by a distance between the worn edge and the exposure surface.

Moreover, the head element can approach the surface of the magnetic disk as much as possible without interference with the magnetic disk since the exposure surface retreats from the flying surface. The term "interference" can be defined as contact or collision of the head element with a tiny protrusion caused by surface roughness of the magnetic disk.

In any of the above-mentioned inventions, the composite layer may contain a magnetoresistance element having a gap appearing on the exposure surface. Formation of the step serves to avoid interference between the head element and the surface of the magnetic disk, so that a momentary temperature rise by collision or a thermal asperity can be prevented in the magnetoresistance element. Information can reliably be read out of the magnetic disk in a precise manner. Therefore, a quasi contact head can employ a magnetoresistance element which is sensitive to variation in temperature.

The edge may be subjected to a def lashing process. The deflashing process serves to eliminate flash formed at production of the slider, so that it is possible to avoid generation of scars on the surface of the magnetic disk and generation of scattering particles from the worn slider at the initial abrasion.

The slider is preferably subjected to a spring load equal to or less than 0.5 gf in a direction toward the magnetic disk. If the spring load is heavier, the edge may excessively wear off when the edge contacts the magnetic disk during rotation of the magnetic disk. In addition, if the spring load is equal to or less than 0.5 gf, the slider hardly wears off while the slider transits from the seated position on the surface of the magnetic disk to the flying position over the surface of the disk.

The slider may be supported on a tip end of a leaf spring with a vibration suppression component for absorbing vibration of the leaf spring. The vibration suppression component may serve to stabilize the attitude of the slider, so that it is possible to suppress variation in the magnetic space to the utmost.

A method of producing the above-mentioned quasi contact head, which comprises a composite layer to contain a head element and an exposure surface retreating from the flying surface for exposing the head element, may comprise allowing the edge between the flying surface and the step to wear off by grinding at the initial abrasion with the magnetic disk. Grinding at the initial abrasion with the magnetic disk can be achieved at a factory.

It should be noted that the edge is formed on either of the slider and the composite layer. If the edge is formed on the composite layer, the magnetic disk can be prevented to the utmost from damaging by collision with the edge since the composite layer is in general made of material softer than that of the slider.

The present invention can be applied not only to the aforementioned magnetic disk drive, but also to any kind of information recording apparatus employing a flying head in general.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
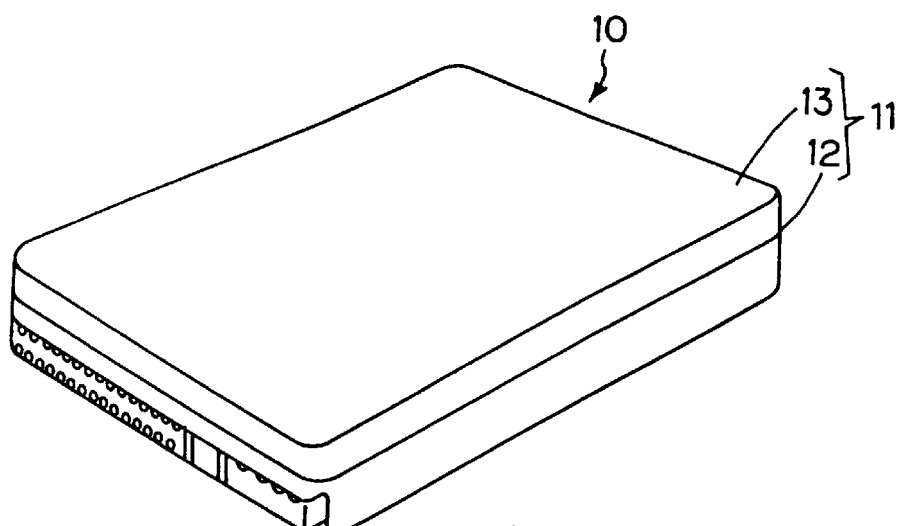
FIG. 1 is a perspective view illustrating a hard disk drive (HDD)

FIG. 1 illustrates a hard disk drive (HDD) 10 as an example of magnetic disk drives. A housing 11 of the HDD 10 comprises a box-shaped housing body 12, and a cover 13 for closing an opening formed in the housing body 12. The HDD 10 may be assembled in a housing of a computer, for example, or can be constructed as an exterior recording medium independent of a computer.

Figure 2:
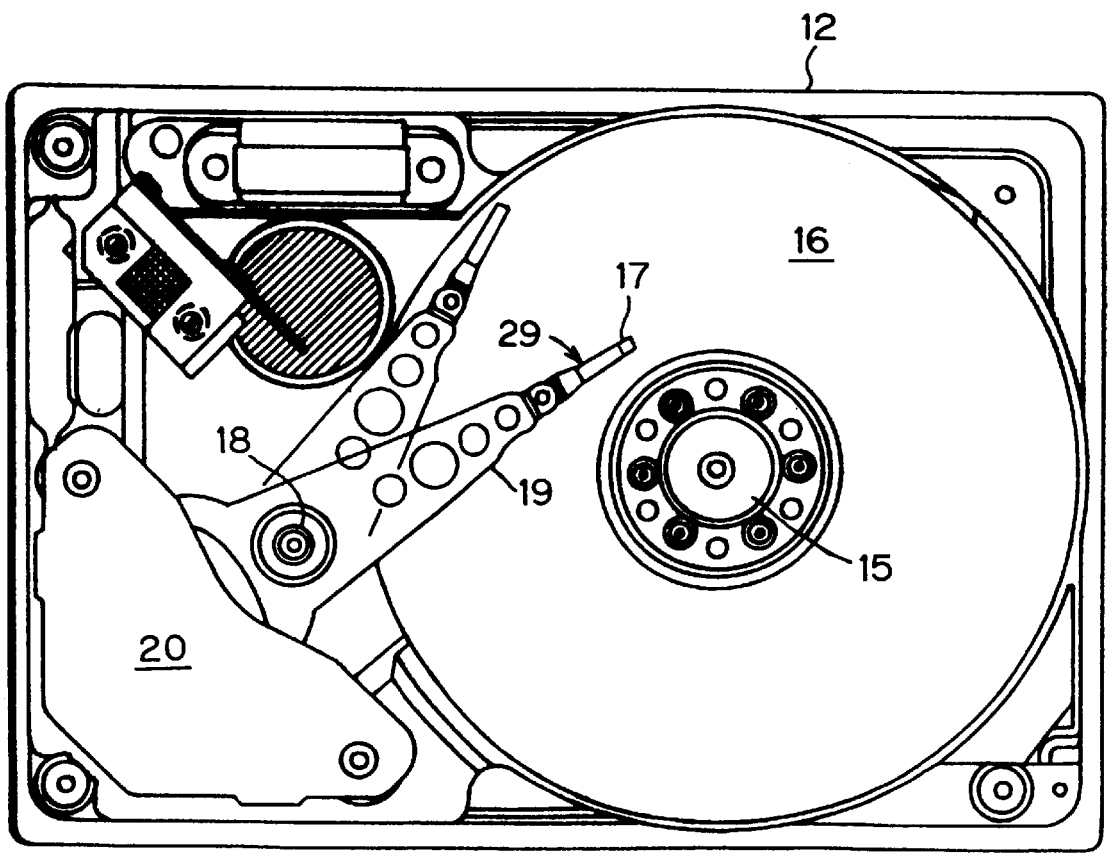
FIG. 2 is a plan view illustrating the inner structure of the HDD.

As shown in FIG. 2, the housing 11 accommodates a magnetic disk 16 mounted around a rotation axis 15, and a quasi contact head 17, according to the present invention, opposed to the magnetic disk 16. The quasi contact head 17 is assembled in a suspension assembly 29 attached at the tip end of a carriage arm 19 which swings around a swinging axis 18. When information is read out or recorded from or into the magnetic disk 16, the carriage arm 19 can be driven for swinging movement by the action of an actuator 20 comprising a magnetic circuit, so that the quasi contact head 17 can be positioned at a target recording track on the surface of the magnetic disk 16.

Figure 3:
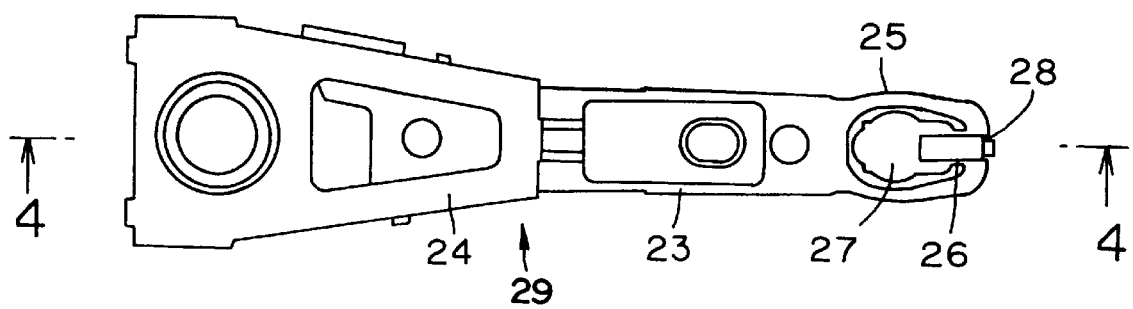
FIG. 3 is an enlarged plan view illustrating the tip end of a carriage arm.

FIG. 3 illustrates an enlarged plan view of the tip end of the suspension assembly 29. As is apparent from FIG. 3, the suspension assembly 29 comprises a tip member 25 attached at the tip end of a rigid support member 24 through a suspension 23. The rigid support member 24 is fixed at the tip end of the carriage arm 19. A slider attachment 27 is connected to the tip member 25 through a leaf spring 26. A vibration suppression component 28 is adhered to the leaf spring 26 for absorbing vibration of the leaf spring 26. The vibration suppression component 28 may comprise a combination of a metallic layer and a synthetic resin layer, for example.

Figure 4:
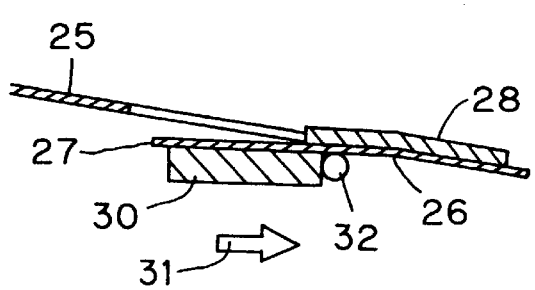
FIG. 4 is an enlarged sectional view taken along the line 4—4 in FIG. 3, illustrating a part of the tip end of the carriage arm.

FIG. 4 illustrates an enlarged sectional view of the tip end of the suspension assembly 29. As is apparent from FIG. 4, a slider 30 is attached to the rear face of the slider attachment 27, namely, on the surface opposed to the magnetic disk 16. Golden balls 32 are formed beside the slider 30 at its trailing end or at an end downstream of air stream 31, which is generated along the surface of the magnetic disk 16 during rotation of the magnetic disk 16. The golden balls 32 serve to electrically connect the slider 30 to a printed wire formed on the tip member 25.

Figure 5:
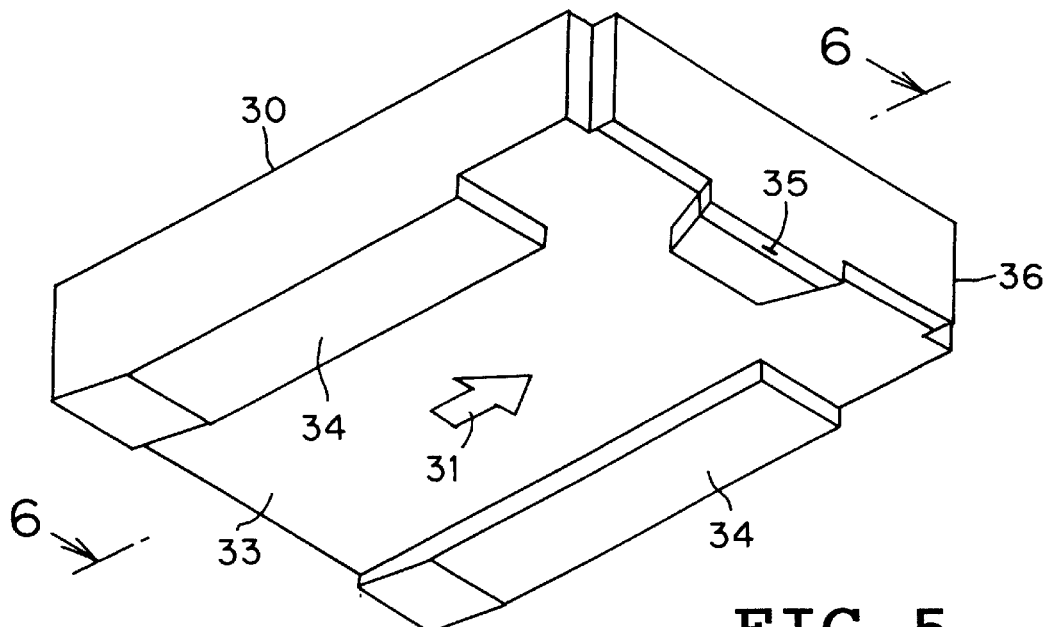
FIG. 5 is a perspective view illustrating a slider of a quasi contact head according to the present invention.

As shown in FIG. 5, the slider 30 comprises a flying surface 33 opposed to the magnetic disk 16. A pair of rails 34 are formed on the flying surface 33 for providing air bearing surfaces (ABS). The slider 30 is capable of flying over the surface of the magnetic disk 16 by utilizing air stream 31 received by the flying surface 33 during rotation of the magnetic disk 16. A composite layer 36 is formed on the slider 30 at its trailing end or at an end downstream of the air stream 31 for containing a magnetoresistance (MR) element with a reading gap 35, for example.

Figure 6:
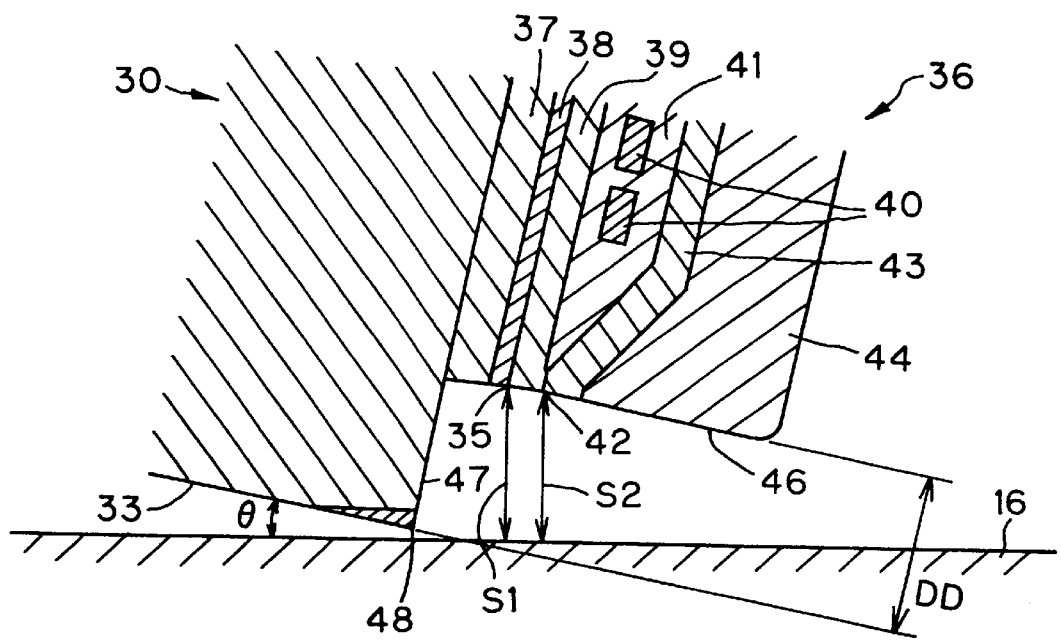
FIG. 6 is an enlarged sectional view taken along the line 6—6 in FIG. 5, illustrating a part of the composite layer for containing a head element.

FIG. 6 illustrates an enlarged sectional view of a part of the composite layer 36. As is apparent from FIG. 6, the composite layer 36 comprises an alumina ($Al_2O_3$) layer 37 formed on the slider 30 of $Al_2O_3TiC$ at its trailing end. Upper and lower shield layers 38, 39 of FeN and the like are superposed on the alumina layer 37. The MR element, not shown, with the reading gap 35 is disposed between the upper and lower shield layers 38, 39.

An insulation layer 41 is superposed on the upper shield layer 39 for containing a spiral coil pattern 40. An upper magnetic pole 43 is superposed on the insulation layer 41 for providing a recording gap 42 between the upper shield layer 39 and itself. The magnetic head element comprising the lower shield layer 38, the MR element, the upper shield layer 39, the coil pattern 40 and the upper magnetic pole 43 is covered with an alumina protection layer 44. Thickness from the alumina layer 37 to the alumina protection layer 44 can be set at 30 $\mu$m to 40 $\mu$m, for example. In this embodiment, the thickness is set at 35 $\mu$m.

The reading gap 35 of the MR element and the recording gap 42 of the inductive element are exposed at an exposure surface 46. A step 47 serves to retract the exposure surface 46 from the flying surface 33 on the slider 30. When air stream along the surface of the magnetic disk 16 acts on the slider 30 at the flying surface 33, the slider 30 takes a slant attitude, with the trailing end lowered, by a pitch angle $\theta$ almost equal to 120 $\mu$rad, so that an edge 48 between the flying surface 33 and the step 47 first approaches the surface of the magnetic disk 16, as shown in FIG. 6.

Assume that the HDD 10 is operated for the first time. The flying height of the slider 30 is determined taking account of the contact or abrasion of the edge 48 with the surface of the magnetic disk 16. The flying height depends on balance between the positive force or the flying force generated by air stream to act on the slider 30 in a direction perpendicular to the surface of the magnetic disk 16 and the negative force or the spring load generated by the suspension 23 and the leaf spring 26 to act on the slider 30 in a direction toward the magnetic disk 16. The flying force of the slider 30 depends on the rotation velocity of the magnetic disk 16, the area of the flying surface 33, the shapes of the ABS and rails 34, and the like.

When the magnetic disk 16 starts to rotate, air stream is generated along the surface of the magnetic disk 16. The air stream acts on the slider 30 at the flying surface 33, so that the flying force is generated for the slider 30 which has been seated on the surface of the magnetic disk 16. The flying force allows the slider 30 to fly with the trailing end lowered. When the flying force is balanced with the spring load from the suspension 23 and the leaf spring 26, the slider 30 keeps flying at a constant flying height.

The initial abrasion with the magnetic disk 16 causes the edge 48 to be ground to retreat from the flying surface 33 by an amount of 2 nm to 3 nm. The surface roughness of the magnetic disk 16 realizes the abrasion to allow the edge 48 to wear off. The surface of a magnetic disk comprising an aluminum substrate or a glass substrate is in general protected by a diamond-like-carbon (DLC) layer. Accordingly, the contact of the edge 48 with the magnetic disk 16 hardly hinders recordation or reproduction of information to or from the magnetic disk 16 unless the edge 48 protrudes into the magnetic disk 16 by the depth enough to reach the magnetized layer under the DLC layer in the magnetic disk 16. In this way, the magnetic spaces S1, S2 between the surface of the magnetic disk 16 and the exposure surface 46 or the gaps 35, 42 can be determined by realizing the distance DD equal to 20 nm to 30 nm between the edge 48 and the exposure surface 46, namely, the height of the step 47. In other words, it is unnecessary to consider the flying height of the edge 48 in determining the magnetic spaces S1, S2 in a quasi contact head, different from a conventional flying head.

When the initial abrasion has been completed, the slider 30 keeps flying at a constant flying height. The edge 48 wearing off hardly affects on the flying height. The constant flying height hardly causes the edge 48 to wear off anymore. Accordingly, there is no interference between the slider 30 and the magnetic disk 16 after the completion of the initial abrasion. Moreover, a first plane including the flying surface 33 always intersects a second plane including the step 47 within the magnetic disk 16 during rotation of the magnetic disk 16. It should be noted that the initial abrasion can be conducted at a factory.

The above-described quasi contact head 17 allows to maintain the magnetic space S1 between the magnetic disk 16 and the reading gap 35 by the distance DD between the edge 48 and the exposure surface 46. Therefore, it is possible to prevent the reading gap 35 from erroneously colliding with any tiny protrusions caused by the surface roughness of the magnetic disk 16. Since a momentary temperature rise or a thermal asperity in the reading gap 35 can be avoided in this manner, a reliable reproduction of precise information from the magnetic disk 16 can be insured.

The slider 30 is preferably subjected to the spring load equal to or less than 0.5 gf from the suspension 23 and the leaf spring 26 in a direction toward the magnetic disk 16. In consideration of the spring load, the slider 30 may have a weight of 1.4 mg to 1.8 mg, preferably 1.6 mg. if the spring load is heavier, the edge 48 may excessively wear off when the edge 48 contacts the magnetic disk 16 during rotation of the magnetic disk 16. In addition, if the spring load is equal to or less than 0.5 gf, the slider 30 hardly wears off while the slider 30 transits from the seated position on the surface of the magnetic disk 16 to the flying position over the surface of the disk 16. Moreover, the vibration suppression component 28 may serve to stabilize the attitude of the slider 30 during rotation of the magnetic disk 16, so that variation in the magnetic space S1 can be avoided to the utmost.

When the above-described quasi contact head 17 is produced, an $Al_2O_3TiC$ wafer substrate is first prepared. The wafer substrate has the alumina layer 37 formed on the surface thereof. The lower shield layer 38, the MR element, the upper shield layer 39, the coil pattern 40, the upper magnetic pole 43 and the alumina protection layer 44 is sequentially formed on the alumina layer 37 with a conventional thin-film forming process. When the thin-film forming process has been completed, the slider 30 is cut out from the wafer substrate. The cut out slider 30 is then subjected to an ion milling with a mask for forming the rails 34 and the like the flying surface 33.

The step 47 can be formed with an ion milling with a mask or any other appropriate method before or after the slider 30 is cut out from the wafer substrate. Otherwise, the step 47 can be obtained by subjecting an ion milling with a mask on the lower shield layer 38, the MR element, the upper shield layer 39, the coil pattern 40, the upper magnetic pole 43 and the alumina protection layer 44, respectively, during the thin-film forming process.

Figure 7:
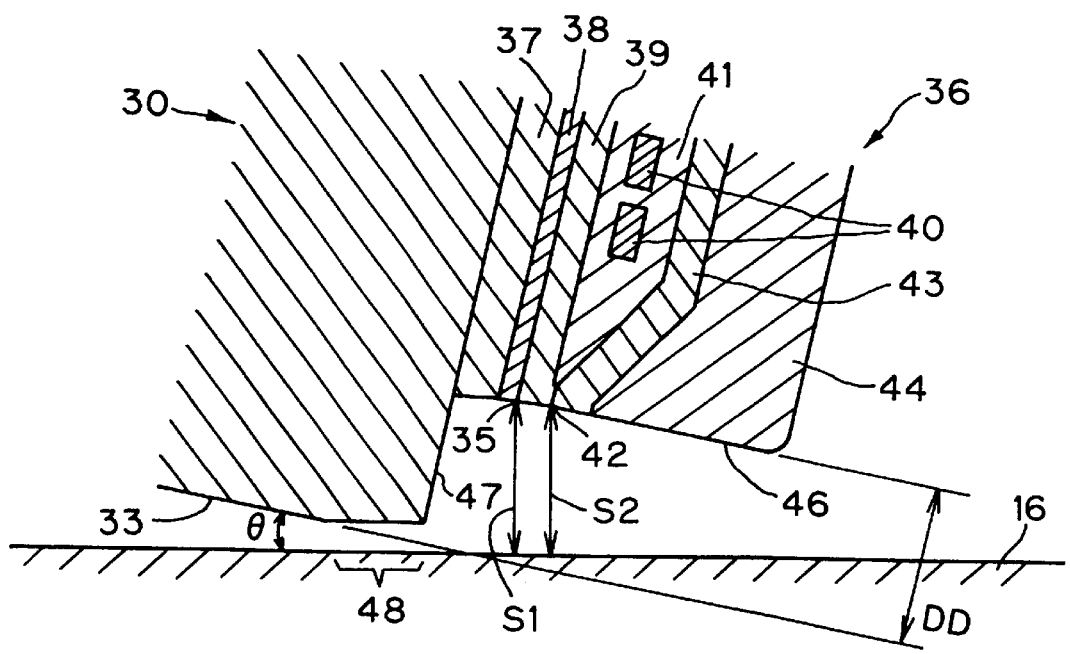
FIG. 7 is the same view as FIG. 6, illustrating a modified example of the quasi contact head.

As shown in FIG. 7, the edge 48 may be subjected to a deflashing process. The def lashing process may serve to eliminate flash formed at production of the slider 30, so that it is possible to avoid generation of scars on the surface of the magnetic disk 16 and generation of scattering particles from the worn slider 30 at the initial abrasion. The deflashing process can be achieved by sliding the slider 30 on a lapping sheet with the edge 48 in contact with the lapping sheet.

Figure 8:
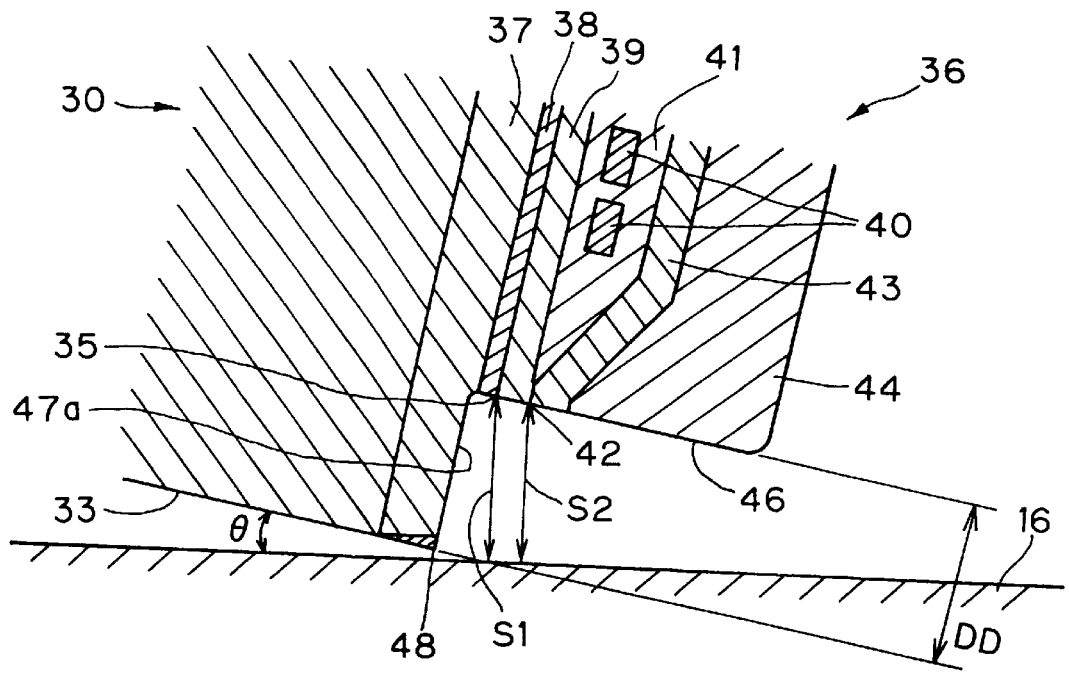
FIG. 8 is the same view as FIG. 6, illustrating another modified example of the quasi contact head.

As shown in FIG. 8, the step 47 formed on the slider 30 can be replaced with a step 47a formed on the composite layer 36. The step 47a allows the edge 48 to be formed on the alumina layer 37 for connecting the step 47a to the flying surface 33. Since alumina is softer than $Al_2O_3TiC$, the magnetic disk 16 may be prevented to the utmost from damaging by collision with the edge 48.

Figure 9:
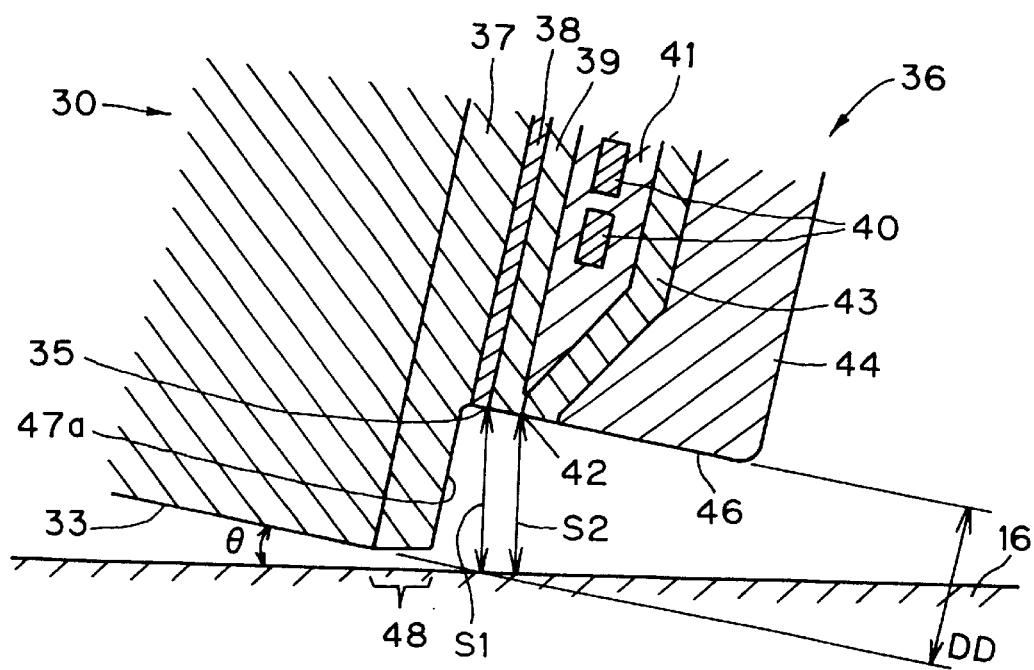
FIG. 9 is the same view as FIG. 6, illustrating a further modified example of the quasi contact head.
Figure 10:
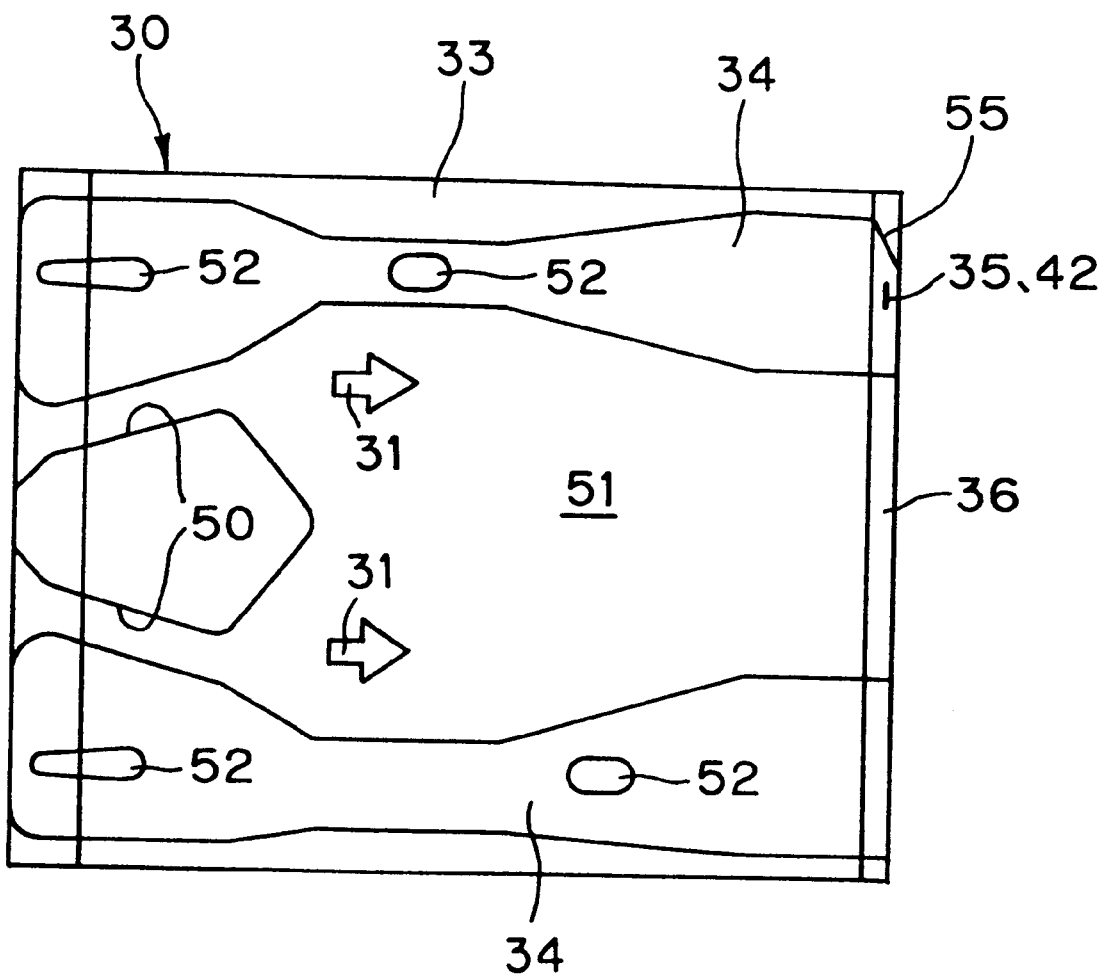
FIG. 10 is a plan view illustrating another example of the quasi contact head.

The step 47a on the composite layer 36 can be formed by leaving the alumina layer 37 while conducting the method of producing the aforementioned step 47 using an ion milling with a mask. And also, the edge 48 may be subjected to a deflashing process in the same manner as mentioned above, as shown in FIG. 9, for example.

The contour of the flying surface 33 can be different from that of the aforementioned one. For example, a wider passage 51 continuous from narrower passages 50 may be formed between a pair of rails 34. When air stream 31 flows through the passages 50, 51, negative pressure may be generated at the flying surface 33. The negative pressure serves to draw the slider 30 toward the magnetic disk 16 so as to support the spring load for canceling the flying force.

Pads 52 may be formed on the slider 30 to protrude from the ABS on the rails 34. The pads 52 are supposed to reduce contact area between the ABS on the rails 34 and the surface of the magnetic disk 16 when the slider 30 is seated on the surface of the magnetic disk 16. If the contact area can be reduced in this manner, adhesion of lubricating oil over the surface of the magnetic disk 16 hardly acts on the slider 30. Accordingly, the slider 30 is supposed to smoothly start flying from the seated position on the surface of the magnetic disk 16.

The reading gap 35 and the writing gap 42 is located on the slider 30 at an extension of one of the rails 34. When air stream 31 acts on the flying surface 33 during rotation of the magnetic disk 16, the slider 30 may take an attitude slant not only in the longitudinal direction of the slider 30 but also in the lateral direction of the slider 30, so that the outer edge 55 at the tip end of the rail 34 is supposed to first approach the surface of the magnetic disk 16. The combination of the slant attitudes in the longitudinal and lateral directions serves to avoid collision between the pads 52 and the surface of the magnetic disk 16. If the outer edge 55 is cut off, the reading gap 35 and the writing gap 42 can be brought nearest to the surface of the magnetic disk 16 without interference between the outer edge 55 and the surface of the magnetic disk 16.

What is claimed is:

1. A quasi contact head having a grinding edge adapted to grind against a surface of a magnetic disk only during an initial break-in period, comprising:

a slider with a flying surface opposed to a magnetic disk;

a composite layer formed on the slider at its trailing end and containing a head element;

an exposure surface formed on the composite layer so as to expose the head element;

a step portion extending beyond the exposure surface to the flying surface; and an edge formed between the step and flying surface, adapted for grinding against a surface of the magnetic disk only during an initial break-in period;

wherein an orientation of said edge relative to the surface of the disk is determined by the grinding during the initial break-in period.

2. The quasi contact head according to claim 1, wherein said head element is a magnetoresistance element having a gap appearing on the exposure surface.

3. The quasi contact head according to claim 1, wherein said edge is subjected to a deflashing process.

4. The quasi contact head according to claim 1, wherein said step portion extends beyond the exposure surface to the flying surface by an amount of 20 nm to 30 nm.

5. The quasi contact head according to claim 1, wherein said grinding serves to retract the edge toward the exposure surface by an amount of 2 nm to 3 nm through the grinding.

6. The quasi contact head according to claim 1, wherein said composite layer has a thickness of 30 $\mu$m to 40 $\mu$m.

7. The quasi contact head according to claim 1, wherein said slider has a weight of 1.4 mg to 1.8 mg.

8. The quasi contact head according to claim 1, wherein said edge is formed on the slider.

9. The quasi contact head according to claim 1, wherein said edge is formed on the composite layer.

10. A magnetic disk drive comprising:

a magnetic disk;

a slider with a flying surface opposed to the magnetic disk;

a composite layer formed on the slider at its trailing end so as to contain a head element;

an exposure surface formed on the composite layer so as to expose the head element; and a step portion extending beyond the exposure surface to the flying surface;

wherein a projection of a first plane including the flying surface and a projection of a second plane including the step portion intersect at a point below a surface of the magnetic disk during rotation of the magnetic disk.

11. The magnetic disk drive according to claim 10, wherein said head element is a magnetoresistance element having a gap appearing on the exposure surface.

12. The magnetic disk drive according to claim 10, wherein an edge formed between said step and said flying surface is subjected to a deflashing process.

13. The magnetic disk drive according to claim 10, wherein said slider is subjected to a spring load equal to or less than 0.5 gf in a direction toward the magnetic disk.

14. The magnetic disk drive according to claim 10, wherein said slider is supported on a tip end of a leaf spring with a vibration suppression component for absorbing vibration of the leaf spring.

15. The magnetic disk drive according to claim 10, wherein said step portion extends beyond the exposure surface to the flying surface by an amount of 20 nm to 30 nm.

16. The magnetic disk drive according to claim 10, wherein grinding between said magnetic disk and an edge formed between said step and said flying surface retracts said edge toward said exposure surface by an amount of 2 nm to 2 nm.

17. The magnetic disk drive according to claim 10, wherein said composite layer has a thickness of 30 $\mu$m to 40 $\mu$m.

18. The magnetic disk drive according to claim 10, wherein said slider has a weight of 1.4 mg to 1.8 mg.

19. The magnetic disk drive according to claim 10, wherein said edge is formed on the slider.

20. The magnetic disk drive according to claim 10, wherein said edge is formed on the composite layer.

\* \* \* \* \*